(12) United States Patent
Wilcox

(10) Patent No.: US 10,731,549 B1
(45) Date of Patent: Aug. 4, 2020

(54) IN-WATER REFUELING SYSTEM FOR UNMANNED UNDERSEA VEHICLES WITH FUEL CELL PROPULSION

(71) Applicant: The United States of America, as Represented by the Secretary of the Navy, Arlington, VA (US)

(72) Inventor: Benjamin Wilcox, Camarillo, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/557,214

(22) Filed: Aug. 30, 2019

(51) Int. Cl.
| | |
|---|---|
| *B63G 8/08* | (2006.01) |
| *F02B 43/10* | (2006.01) |
| *B63G 8/00* | (2006.01) |
| *G01L 19/00* | (2006.01) |
| *G01K 13/02* | (2006.01) |

(52) U.S. Cl.
CPC ............ *F02B 43/10* (2013.01); *B63G 8/001* (2013.01); *B63G 8/08* (2013.01); *B63G 2008/002* (2013.01); *F02B 2043/106* (2013.01); *G01K 13/02* (2013.01); *G01L 2019/0053* (2013.01)

(58) Field of Classification Search
CPC .... F02B 43/10; F02B 2043/106; B63G 8/001; B63G 8/08; B63G 2008/002; G01K 13/02
See application file for complete search history.

(56) References Cited

U.S. PATENT DOCUMENTS

| | | | | |
|---|---|---|---|---|
| 5,707,424 | A * | 1/1998 | Tom ........................ | F17C 11/00 95/95 |
| 6,484,491 | B1 * | 11/2002 | Thordarson ............ | B63H 11/02 440/45 |
| 8,236,149 | B2 * | 8/2012 | Wilson ...................... | C25B 9/06 204/272 |
| 2004/0045836 | A1 * | 3/2004 | Tseng .................... | C02F 1/4618 205/620 |

(Continued)

OTHER PUBLICATIONS

Woodford, Chris, Explain That Stuff—How do fuel cells work in hydrogen cars?, Internet Article, 2008, United States.

(Continued)

*Primary Examiner* — Stephen P Avila
(74) *Attorney, Agent, or Firm* — Naval Air Warfare Center Weapons Division; Jimmy M. Sauz

(57) ABSTRACT

An in-water refueling system for unmanned undersea vehicles with fuel cell propulsion. The in-water refueling system may store a liquid such as water at constant pressure and may dispense gases such as hydrogen or oxygen for refueling. In its basic configuration, the in-water refueling system may comprise a tank with an interior space for storing the liquid; a pump for regulating the flow of liquid into the interior space of the tank; an electrolysis stack assembly for converting the liquid into one or more gases; and open-bottom cylinders for storing and dispensing the gases. Each open-bottom cylinder may comprise a float sensor for determining the amount of fluids entering its cylindrical space. The in-water refueling system may further comprise a controller for regulating a temperature and a fluid pressure in the tank. Dispense lines and valves may be utilized to release the gases from the tank.

20 Claims, 5 Drawing Sheets

(56) References Cited

U.S. PATENT DOCUMENTS

| | | | | |
|---|---|---|---|---|
| 2005/0217991 A1* | 10/2005 | Dahlquist, Jr. | ............ | C25B 1/04 |
| | | | | 204/267 |
| 2007/0084728 A1* | 4/2007 | Martez | .................... | B01D 61/44 |
| | | | | 204/627 |
| 2010/0275858 A1* | 11/2010 | Jeffs | ........................ | F02B 43/10 |
| | | | | 123/3 |
| 2012/0280517 A1* | 11/2012 | Hair, III | .................. | F02B 43/10 |
| | | | | 290/1 R |
| 2014/0290595 A1* | 10/2014 | Owens | ................. | G07C 5/0808 |
| | | | | 123/3 |
| 2017/0107899 A1* | 4/2017 | Haring | .................... | F02B 43/10 |
| 2018/0339759 A1* | 11/2018 | Reeh | ...................... | B63H 21/00 |
| 2020/0025062 A1* | 1/2020 | Schuurman | ............. | F02B 43/10 |

OTHER PUBLICATIONS

The Economist, Electric vehicles powered by fuel-cells get a second look, Internet Article, Sep. 25, 2017, United States.

* cited by examiner

US 10,731,549 B1

IN-WATER REFUELING SYSTEM FOR UNMANNED UNDERSEA VEHICLES WITH FUEL CELL PROPULSION

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF USE

The present disclosure relates generally to refueling systems, and more particularly, to in-water refueling systems for unmanned undersea vehicles (UUVs).

SUMMARY OF ILLUSTRATIVE EMBODIMENTS

To minimize the limitations in the related art and other limitations that will become apparent upon reading and understanding the present specification, the following discloses embodiments of a new and useful an in-water refueling system for refueling undersea unmanned vehicles with fuel cell propulsion.

One embodiment may be an in-water refueling system for unmanned undersea vehicles (UUV) with fuel cell propulsion, comprising: a tank having an interior space; a main pump having an outlet that is sealably coupled to a first opening of the tank and in fluid communication with the interior space; one or more open-bottom cylinders disposed within the tank and each comprising: a cylindrical body sealably coupled to one or more second openings of the tank and having a cylindrical space in fluid communication with the interior space of the tank; and a float sensor adapted to raise and lower via buoyancy; one or more dispense lines disposed outside the tank and sealably coupled to the one or more second openings of the tank, such that the one or more vent lines may be in fluid communication with the one or more cylindrical spaces; a secondary submersible pump disposed within the tank for pumping a liquid in the interior space; and an electrolysis stack assembly disposed within the tank and adapted to produce one or more gases, the electrolysis stack assembly comprising: one or more electrolysis stacks for converting the liquid into the one or more gases; an inlet in fluid communication with the secondary submersible pump; and one or more outlet supply lines traversing into the one or more cylindrical spaces through one or more bottom openings of the one or more open-bottom cylinders for releasing the one or more gases into the one or more cylindrical spaces. The in-water refueling system may further comprise a controller having a temperature sensor and a pressure sensor for determining a temperature and a fluid pressure within the tank, respectively. The in-water refueling system may be characterized in that the one or more dispense lines may comprise one or more valves configured to operably couple to one or more fuel lines. The one or more gases may be hydrogen and oxygen. The in-water refueling system may further comprise a liquid storage bladder in fluid communication with an inlet of the main pump. The in-water refueling system may further comprise a motor operably coupled to the main pump.

Another embodiment may be an in-water refueling system for UUVs with fuel cell propulsion, comprising: a tank having a first opening, at least two second openings, and an interior space; a main pump having an outlet sealably coupled to the first opening of the tank and in fluid communication with the interior space; a first open-bottom cylinder, comprising: a first cylindrical body sealably coupled to one of the at least two second openings and having a first cylindrical space in fluid communication with the interior space; and a first float sensor adapted to raise and lower via buoyancy; a second open-bottom cylinder, comprising: a second cylindrical body sealably coupled to another of the at least two second openings of the tank and having a second cylindrical space in fluid communication with the interior space; and a second float sensor adapted to raise and lower via buoyancy; first and second dispense lines disposed outside the tank and sealably coupled to the at least two second openings of the tank, such that the first and second dispense lines may be in fluid communication with the first and second cylindrical spaces; a secondary submersible pump disposed within the tank for pumping a liquid in the interior space; and an electrolysis stack assembly disposed within the tank and adapted to produce first and second gases, the electrolysis stack assembly comprising: an electrolysis stack for converting the liquid into the first and second gases; an inlet in fluid communication with the secondary submersible pump; a first outlet supply line traversing into the first cylindrical space for releasing the first gas into the first cylindrical space; and a second outlet supply line traversing into the second cylindrical space for releasing the second gas into the second cylindrical space. The in-water refueling system may further comprise a controller having a temperature sensor and a pressure sensor for determining a temperature and a fluid pressure within the tank, respectively. The controller may further comprise a variable frequency drive (VFD) operably coupled to the main pump for regulating the fluid pressure of the tank. The controller may further comprise a flow meter in communication with the secondary submersible pump for regulating an electrolysis based on the temperature. The first gas may be hydrogen. The second gas may be oxygen. The in-water refueling system may further comprise a liquid storage bladder in fluid communication with an inlet of the main pump. The in-water refueling system may further comprise a motor operably coupled to the main pump.

Another embodiment may be an in-water refueling system for UUVs with fuel cell propulsion, comprising: a tank having a bottom opening, first and second top openings, and an interior space for storing a liquid; a rotary screw pump having an outlet that is sealably coupled to the bottom opening and in fluid communication with the interior space; a first open-bottom cylinder disposed within the tank and comprising: a first cylindrical body sealably coupled to the first top opening and having a first cylindrical space in fluid communication with the interior space; and a first float sensor adapted to raise and lower via buoyancy; a second open-bottom cylinder disposed within the tank and comprising: a second cylindrical body sealably coupled to the second top opening and having a second cylindrical space in fluid communication with the interior space; and a second float sensor adapted to raise and lower via buoyancy; wherein the first open-bottom cylinder may be larger than the second open-bottom cylinder; first and second dispense lines disposed outside the tank and sealably coupled to the first and second top openings, respectively, such that the first and second dispense lines may be in fluid communication with the first and second cylindrical spaces; a secondary submersible pump disposed within the tank for pumping the liquid; and an electrolysis stack assembly disposed within the tank and adapted to produce oxygen and hydrogen, the electrolysis stack assembly comprising: an electrolysis stack for converting the liquid into the oxygen and the hydrogen; an inlet in fluid communication with the secondary submersible pump for pumping the liquid into the electrolysis stack; a first outlet supply line traversing into the first cylindrical space for releasing the hydrogen into the first cylindrical space; and a second outlet supply line traversing into the second cylindrical space for releasing the oxygen into the second cylindrical space. The first and second float sensors may substantially encircle at least portions of the first and the second outlet supply lines within the first and second cylindrical spaces, respectively, such that the first and second float sensors may be adapted to raise and lower along the first and the second outlet supply lines. The in-water refueling system may further comprise a controller having a temperature sensor and a pressure sensor for determining a temperature and a fluid pressure within the tank, respectively. The controller may further comprise a VFD operably coupled to the rotary screw pump for regulating the fluid pressure in the tank. The controller may further comprise a flow meter in communication with the secondary submersible pump for regulating an electrolysis based on the temperature. The in-water refueling system may further comprise a liquid storage bladder in fluid communication with an inlet of the rotary screw pump. The in-water refueling system may further comprise a motor operably coupled to the rotary screw pump.

Another embodiment may be an in-water refueling system having components with a favorable material structural strength in accordance with the components' specification. In particular, the electrolysis stack assembly may be structurally supported by the surrounding fluid, such that the material strength of the electrolysis stack assembly need only withstand a minimal pressure within the interior space of the tank caused by the submersible pump delivering fluid through the tank. This pressure within the interior space is preferably unlike the large difference in pressure between the interior and the exterior of the tank. This difference in pressure may also be substantially independent of the pressure within the interior space of the tank. The fluid within the first and second outlet supply lines (which may hold or transport hydrogen gas and oxygen gas, respectively) may have substantially the same fluid pressure as the exterior of the respective first and second outlet supply lines and interior space of the tank, such that the wall thicknesses of the first and second outlet supply lines need not support difference in fluid pressure. This fluid pressure within the first and second outlet supply lines may be substantially independent of the pressure within the interior space of the tank. The fluid within the interior of the first and second open-bottom cylinders (which may hold hydrogen gas and oxygen gas, respectively) may substantially have the same fluid pressure as on the exterior of the respective first and second open-bottom cylinders and the interior space of the tank, such that the wall thickness of the first and second open-bottom cylinders need not support difference in fluid pressure. This fluid pressure within the first and second open-bottom cylinders may be substantially independent of the pressure within the interior space of the tank. As the fluid pressure within the tank and gas pressures within the first and second outlet supply lines (i.e., hydrogen gas pressure, oxygen gas pressure) are all substantially the same pressure, the gas pressures within the gas channels inside the cell plates of the electrolysis stack assembly are likewise at substantially the same pressure, such that the cell plates need not withstand a difference in pressure from one side to the other. This condition is substantially independent of the pressure within the interior of the tank. In general, the components structures within the interior space of the tank are favorable to withstand compressive loads that may vary widely with fluid pressure and need not withstand tensile loads that substantially may not very widely with fluid pressure.

Another embodiment may be an in-water refueling system having a favorable specification and maintenance of gas pressure. As noted, since fluid pressure, hydrogen gas pressure, and oxygen gas pressure are substantially the same (known hereinafter as, "pressure-of-use" of the gas), the pressure-of-use may be selectively determined based on the amount of liquid compressed into the interior space of the tank by the main pump. Preferably, the main pump is a screw-pump such that the pressure-of-use of the gas may be elevated by compressing/adding fluid into the interior space of the tank via rotation or turning of a screw in the "forward" rotational direction, and the pressure-of-use of the gas may be lowered by decompressing/removing liquid from the interior space of the tank by rotation or turning of the screw in the "back" or "reverse" rotational direction. Upon selection of the pressure-of-use of the gas at some elevated pressure, activating the electrolysis stack assembly and secondary submersible pump may convert the liquid into hydrogen gas and oxygen gas, each of which may accumulate and stored above the liquid within its respective open-bottom cylinder. Here, the process may elevate the pressure-of-use of the gas at the same time, and the pressure-of-use of the gas may be maintained with minimal changes by operating the screw pump in reverse to remove liquid from the interior space of the tank. Upon inactivating the electrolysis stack assembly and secondary submersible pump and opening the valve outside the tank on the first outlet supply line for hydrogen gas, the hydrogen gas stored may be transferred from its respective first open-bottom cylinder via diffusion. The pressure-of-use of the gas may be maintained with minimal changes, at substantially constant pressure, by forwardly operating the screw pump in adding liquid to the interior space of the tank, as the hydrogen gas leaves. Upon inactivating the electrolysis stack assembly and secondary submersible pump and opening the valve outside the tank on the second outlet supply line for oxygen gas, the oxygen gas stored may be transferred from its respective second open-bottom cylinder via diffusion. The pressure-of-use of the gas may be maintained with minimal changes, at substantially constant pressure, by forward operating the screw pump in adding liquid to the interior space of the tank as the hydrogen gas leaves. Upon activation of the electrolysis stack assembly and submersible pump and opening the valve outside the tank on the first outlet supply line for hydrogen gas, the hydrogen gas stored may be transferred from its first respective open-bottom cylinder via diffusion. The pressure-of-use of the gas may by maintained with minimal changes, at substantially constant pressure, when the hydrogen gas production rate by the electrolysis stack assembly is substantially the same as the hydrogen gas transfer rate by diffusion without operation of the screw pump. While the electrolysis stack assembly and submersible pump are activated, (and the valve remains open outside the tank on the second outlet supply line for oxygen gas), the oxygen gas stored may be transferred from its respective second open-bottom cylinder via diffusion. The pressure-of-use of the gas may by maintained with minimal changes, at substantially constant pressure, when the oxygen gas production rate by the electrolysis stack assembly is substantially same as the oxygen gas transfer rate by diffusion without operation of the screw pump. While the electrolysis stack assembly and submersible pump remains activated (and valves are open for the first and second outlet supply lines), the stored hydrogen and oxygen gases may be transferred from their respective open-bottom cylinder via diffusion. The pressure-of-use of the gas may by maintained with minimal changes, at substantially constant pressure, when the production rate by the electrolysis stack assembly is substantially the same as the hydrogen gas transfer rate by diffusion. The oxygen gas production rate may also be substantially the same as the oxygen gas transfer rate by diffusion, without operation of the screw pump. In general, the pressure-of-use of the gas within the interior space of the tank may be favorably specified, maintained, and varied while dispensing by operation of the main screw-pump in forward and reverse, or by increasing and decreasing the hydrogen and oxygen gas production rate of the electrolysis stack assembly, or by a combination of the two.

Another embodiment may be an in-water refueling system capable of fire suppression in the event of a fire or explosion originating from ignition of hydrogen gas fuel and oxygen gas oxidizer within the tank. In its most probable occurrence, a combustible mixture of hydrogen gas and oxygen gas may accumulate within the upper portion of the interior space of the tank due to possible leakage from the open-bottom cylinders or electrolysis stack assembly. In the event of an ignition due to a combustible mixture, the resulting flame will generate heat that may result in a rise in temperature and pressure and propagation of an explosion. The flame may be extinguished and the propagation of the explosion may be halted when the heat vaporizes the adjacent liquid water within the interior space of the tank such that liquid water mixes with the combustible mixture of hydrogen gas and oxygen gas. In general, a favorable condition exists for fire suppression when storing hydrogen gas and oxygen gas within close proximity. The surrounding environment preferably contains liquid water, and the ratio of the parts of water to the parts of hydrogen gas and oxygen gas is suitably maintained, as for example, the parts of water to parts of hydrogen gas and oxygen gas should be maintained above a ratio of four to one.

It is an object to provide an in-water refueling system, comprising a tank and a main pump for delivering liquid into the interior space of the tank. The liquid is preferably water suitably deionized for use in a polymer exchange membrane electrolysis stack assembly and may be delivered from a water bladder. Upon filling the interior space of the tank with the liquid and sealing the tank by, for example, inserting a plug or closing a valve, the main pump may further deliver and compress liquid into the tank, thereby elevating the pressure of the liquid within the interior space of the tank. The in-water refueling system may further comprise within the interior space of the tank: an electrolysis stack assembly that draws electrical power for converting the liquid within the tank into hydrogen gas and oxygen gas; a secondary submersible pump for delivering liquid through the electrolysis stack assembly at a rate in accordance to the manufacture specification of draw of electrical power and hydrogen gas/oxygen gas production rate; a temperature sensor in communication with the electrolysis stack assembly to activate or inactivate the electrolysis stack assembly in accordance to the manufacture specification of temperature operating range; a pressure sensor in communication with the main pump for regulating the flow of liquid into the tank and the pressure of hydrogen gas and oxygen gas in equilibrium with the liquid, at substantially the same pressure, based on fluid pressure; a first open-bottom cylinder for storing and dispensing hydrogen gas; a second open-bottom cylinder for storing and dispensing oxygen gas; a first outlet supply line for transferring hydrogen gas from the electrolysis stack assembly to the first open-bottom cylinder; a second outlet supply line for transferring the oxygen gas from the electrolysis stack assembly to the second open-bottom cylinder; a first dispense line for transferring hydrogen gas from the first open-bottom cylinder to the outside of the tank; a second dispense line for transferring the oxygen gas from the second open-bottom cylinder to the outside of the tank; a first valve on the first dispense line for the purpose of regulating the transfer of hydrogen gas from within the first open-bottom cylinder in the operation of cascade storage refilling a hydrogen gas storage tank or in the operation of refueling a UUV with fuel cell propulsion hydrogen gas storage tank, or for the purpose of venting the hydrogen gas from within the first open-bottom cylinder to the atmosphere; and outside the tank, a second valve on the second dispense line for the purpose of regulating the transfer of oxygen gas from within a second open-bottom cylinder in the operation of cascade storage refilling an oxygen gas storage tank or in the operation of refueling a UUV with fuel cell propulsion oxygen gas storage tank, or for the purpose of venting the oxygen gas from within the second open-bottom cylinder to the atmosphere.

Each open-bottom cylinder may also comprise a float sensor for determining the amount of fluid within the open-bottom cylinder based on density. Because gas is less dense than liquid, the gas generally accumulates above the liquid within the open-bottom cylinder. In particular, the shape of the float may be a donut with small clearance between the sides of the float and the open-bottom cylinder and between the center opening of the float and the gas supply line. In this manner, the float may prevent the accumulated gas from transferring into the liquid within the open-bottom cylinder, according to Henry's Law of solubility of gases by making small the liquid surface area under the gas. In particular, the float sensors may move vertically up and down between two limit switches. Contact of the float sensor with the upper limit switch may indicate that the corresponding open-bottom cylinder is depleted of stored gas, and thus, may signal closure of the respective valve to prevent delivery of liquid from within the tank through the dispense lines. Contact of the float sensor with the upper limit switch may also activate the electrolysis stack assembly to produce more gas. Similarly, contact of the float sensor with the bottom limit switch may indicate that the corresponding open-bottom cylinder is filled with stored gas, and thus, may signal opening of the respective valve to prevent gas from leaving the corresponding bottom opening of the open-bottom cylinder by removing the gas through the respective dispense line. Contact of the float sensor with the bottom limit switch may also inactivate the electrolysis stack assembly to halt the production of gases. In some embodiments, the float sensors may also include a linear transducer to determine the exact measurement of gas stored within the open-bottom cylinder. In a preferred embodiment, the exact volume of hydrogen and oxygen inside the open-bottom cylinders determined by the float sensors may be both established and maintained substantially unchanged via feedback to a controller. The controller may control the opening of the valves in a manner such that the rate of gas evolution by the electrolysis stack assembly substantially equals to the rate of gas dispensing through the valves.

In various embodiments, there exists within the interior space of the tank so filled with liquid compressed to elevated pressure, into every available space and in communication throughout, and comprised of the electrolysis stack assembly, secondary submersible pump, first outlet supply line for hydrogen gas, first open-bottom cylinder into which hydrogen gas accumulates when the electrolysis stack assembly draws electrical power, second outlet supply line for oxygen gas, second open-bottom cylinder into which oxygen gas accumulates when the electrolysis stack assembly draws electrical power, first dispense line with a first valve outside the tank for hydrogen gas, and a second dispense line with a second valve outside the tank for oxygen gas, so described a favorable condition for specification of these components material structural strength: the electrolysis stack assembly is structurally supported by the surrounding fluid such that its material strength need only withstand the small difference in pressure between inside and the interior space of the tank caused by the secondary submersible pump delivering fluid through the tank and not the large difference in pressure between inside to the outside of the tank, a condition substantially independent of the interior space of the tank pressure; the fluid on the inside of the first outlet supply line and inside of the second outlet supply line is in communion with at substantially the same fluid pressure as on the outside of the first outlet supply line and second outlet supply line and interior space of the tank, such that the respective gas line wall thickness need not support difference in fluid pressure, a condition substantially independent of the interior space of the tank pressure; and the fluid on the inside of the first open-bottom cylinder and inside of the second open-bottom cylinder is in communion with at substantially the same fluid pressure as on the outside of the first open-bottom cylinder and second open-bottom cylinder and interior space of the tank, such that the respective open-bottom cylinder wall thickness need not support difference in fluid pressure, a condition substantially independent of the interior space of the tank pressure; as the fluid pressure, hydrogen gas pressure within the first outlet supply line, and oxygen gas pressure within the second outlet supply line are all at substantially the same pressure, the hydrogen gas pressure and oxygen gas pressure within the hydrogen gas and oxygen gas channels inside the electrolysis stack assembly cell plate(s) are at substantially the same pressure such that the cell plate need not withstand a difference in pressure from one side to the other, a condition substantially independent of the interior of the tank pressure. In general, the components structures within the interior space of the tank are favorable to withstand compressive loads that may vary widely with fluid pressure and need not withstand tensile loads that substantially may not very widely with fluid pressure.

In various embodiments, there exists within the interior space of the tank so filled with liquid compressed to elevated pressure, into every available space and in communication throughout, and comprised of the electrolysis stack assembly, secondary submersible pump, first outlet supply line for hydrogen gas, first open-bottom cylinder into which hydrogen gas accumulates when the electrolysis stack assembly draws electrical power, second outlet supply line, second open-bottom cylinder into which oxygen gas accumulates when the electrolysis stack assembly draws electrical power, first dispense line with a first valve outside the tank for hydrogen gas, and second dispense line with a second valve outside the tank for oxygen gas, so described a favorable condition for specification and maintenance of gas pressure: As noted, since the fluid pressure, hydrogen gas pressure, and oxygen gas pressure are substantially the same (hereinafter designated as "pressure-of-use" of the gas), the pressure-of-use may be selectively determined from the amount of liquid compressed into the interior space of the tank by the main pump. Preferably, the main pump is a screw-pump such that the pressure-of-use of the gas may be elevated by compressing/adding fluid into the interior space of the tank by turning its screw in the "forward" rotational direction, and the pressure-of-use of the gas may be lowered by decompressing/removing liquid from the interior space of the tank by turning its screw in the "back" or "reverse" rotational direction. Upon selection of the pressure-of-use of the gas at some elevated pressure, activating the electrolysis stack assembly and secondary submersible pump converts the liquid into hydrogen gas and oxygen gas, each accumulating and stored above the liquid within its respective open-bottom cylinder, the process tending to elevate the pressure-of-use of the gas at the same time; the pressure-of-use of the gas may be maintained with substantially small change by operating the screw pump in reverse to remove liquid from the interior space of the tank. Upon inactivating the electrolysis stack assembly and secondary submersible pump and opening the first valve outside the tank on the first outlet supply line, the hydrogen gas stored is preferably transferred from the first open-bottom cylinder by diffusion; the pressure-of-use of the gas may be maintained with substantially small change, at substantially constant pressure, by operating the screw pump in forward to add liquid into the interior space of the tank as hydrogen gas leaves. Upon inactivating the electrolysis stack assembly and secondary submersible pump and opening the second valve outside the tank on the second outlet supply line, the oxygen gas stored is preferably transferred from the second open-bottom cylinder by diffusion; the pressure-of-use of the gas may be maintained with substantially small change, at substantially constant pressure, by operating the screw pump in forward to add liquid into the interior space of the tank as hydrogen gas leaves. Upon activating the electrolysis stack assembly and secondary submersible pump and opening the first valve outside the tank on the first outlet supply line, the hydrogen gas stored is preferably transferred from the first open-bottom cylinder by diffusion; the pressure-of-use of the gas may by maintained with substantially small change, at substantially constant pressure, when the electrolysis stack hydrogen gas production rate is substantially same as the hydrogen gas transfer rate by diffusion without operating the screw pump in forward or reverse. During activation of the electrolysis stack assembly and secondary submersible pump and opening the second valve outside the tank on the second outlet supply line, the oxygen gas stored is preferably transferred from the second open-bottom cylinder by diffusion; the pressure-of-use of the gas may by maintained with substantially small change, at substantially constant pressure, when the electrolysis stack oxygen gas production rate is substantially same as the oxygen gas transfer rate by diffusion without operating the screw pump in forward or reverse. During activation of the electrolysis stack assembly and second submersible pump and opening the first valve outside the tank on the first outlet supply line and the second valve outside the tank on the second outlet supply line, the hydrogen gas stored and oxygen gas stored are preferably transferred from the first and second open-bottom cylinder, respectively, by diffusion; the pressure-of-use of the gas may by maintained with substantially small change, at substantially constant pressure, when the electrolysis stack hydrogen gas production rate is substantially same as the hydrogen gas transfer rate by diffusion and the oxygen gas production rate is substantially the same as the oxygen gas transfer rate by diffusion, without operating the screw pump in forward or reverse. In general, the pressure-of-use of the gas within the interior space of the tank may be favorably specified, maintained, and varied while dispensing by operating the main pump in forward and reverse, or by increasing and decreasing the electrolysis stack assembly hydrogen gas and oxygen gas production rate, or by a combination of the two.

In various embodiments, there exists within the interior space of the tank so filled with liquid compressed to elevated pressure, into every available space and in communication throughout, and comprised of the electrolysis stack assembly, secondary submersible pump, first outlet supply line, first open-bottom cylinder into which hydrogen gas accumulates when the electrolysis stack assembly draws electrical power, second outlet supply line, second open-bottom cylinder into which oxygen gas accumulates when the electrolysis stack assembly draws electrical power, first dispense line with a first valve outside the tank, and second dispense line with a second valve outside the tank, so described a favorable condition for fire suppression in event of a fire or explosion originating from ignition of hydrogen gas fuel and oxygen gas oxidizer inside the tank: in its most probable occurrence a combustible mixture of hydrogen gas and oxygen gas may accumulate in the upper interior space of the tank as the result of leaking from their respective open-bottom cylinders or from the electrolysis stack assembly. In the case of ignition of the combustible mixture, the resulting flame will generate heat that may result in temperature and pressure rise and the propagation of an explosion, said flame may be extinguished and said propagation of explosion may be halted when the heat thus generated vaporizes the adjacent liquid water within the interior space of the tank such that it mixes with the combustible mixture of hydrogen gas and oxygen gas. In general, a favorable condition exists for fire suppression in the storage of hydrogen gas and oxygen gas in close proximity when the surrounding environment contains liquid water and the ratio of the parts of water to parts of hydrogen gas and oxygen gas is suitably maintained, as for example, the parts of water to parts of hydrogen gas and oxygen gas should be maintained above a ratio of four to one.

Various embodiments of the in-water refueling system disclosed herein may be used as a land-based refueling system for fuel cell vehicles and stationary fuel cells. Embodiments of the in-water refueling system may also be used to refuel hydrogen gas fuel storage tanks of fuel cell vehicles on land. Other embodiments of the in-water refueling system may refill oxygen gas storage tanks for welding or medical usage.

It is an object to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The drawings are illustrative embodiments. They do not illustrate all embodiments. They do not set forth all embodiments. Other embodiments may be used in addition or instead. Details, which may be apparent or unnecessary, may be omitted to save space or for more effective illustration. Some embodiments may be practiced with additional components or steps and/or without all of the components or steps, which are illustrated. When the same numeral appears in different drawings, it is intended to refer to the same or like components or steps.

Figure 1:
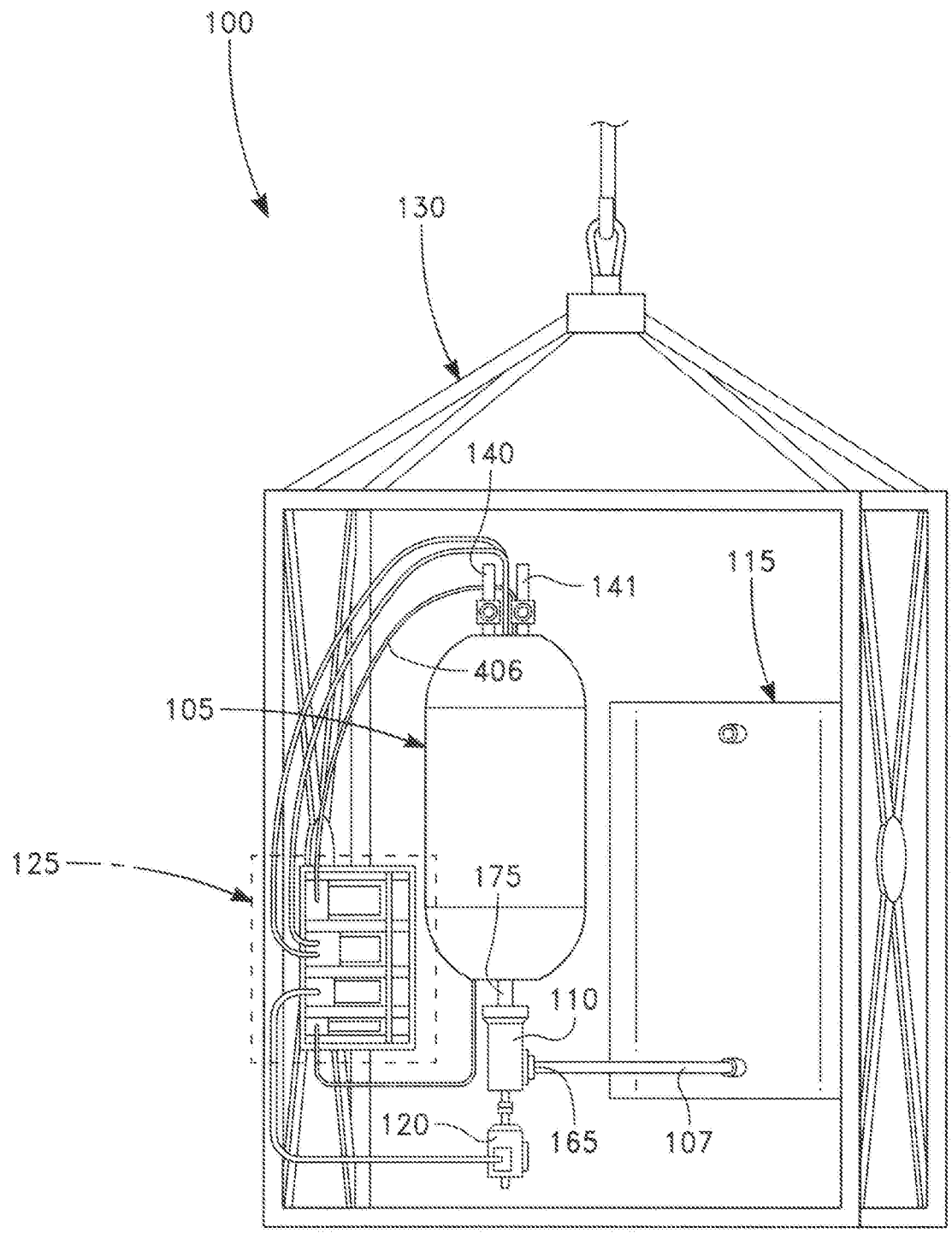
FIG. 1 illustrates a perspective view of one embodiment of an in-water refueling system for refueling unmanned undersea vehicles (UUV) with fuel cell propulsion, in accordance with the present disclosure.

It is to be understood that the foregoing general description and the following detailed description are exemplary and explanatory only and are not to be viewed as being restrictive of the embodiments, as claimed. Further advantages of these embodiments will be apparent after a review of the following detailed description of the disclosed embodiments, which are illustrated schematically in the accompanying drawings and in the appended claims.

DETAILED DESCRIPTION OF ILLUSTRATIVE EMBODIMENTS

In the following detailed description, numerous specific details are set forth in order to provide a thorough understanding of various aspects of one or more embodiments of the in-water refueling system for unmanned undersea vehicles (UUV) with fuel cell propulsion, However, these embodiments may be practiced without some or all of these specific details. In other instances, well-known methods, procedures, and/or components have not been described in detail so as not to unnecessarily obscure the aspects of these embodiments.

Before the embodiments are disclosed and described, it is to be understood that these embodiments are not limited to the particular structures, process steps, or materials disclosed herein, but is extended to equivalents thereof as would be recognized by those ordinarily skilled in the relevant arts. It should also be understood that the terminology used herein is used for the purpose of describing particular embodiments only and is not intended to be limiting.

Reference throughout this specification to "one embodiment," "an embodiment," or "another embodiment" may refer to a particular feature, structure, or characteristic described in connection with the embodiments of the present disclosure. Thus, appearances of the phrases "in one embodiment" or "in an embodiment" in various places throughout this specification may not necessarily refer to the same embodiment.

Furthermore, the described features, structures, or characteristics may be combined in any suitable manner in various embodiments. In the following description, numerous specific details are provided, such as examples of materials, fasteners, sizes, lengths, widths, shapes, etc. . . . , to provide a thorough understanding of the embodiments. One skilled in the relevant art will recognize, however, that the scope of the disclosed embodiments can be practiced without one or more of the specific details, or with other methods, components, materials, etc. . . . . In other instances, well-known structures, materials, or operations are generally not shown or described in detail to avoid obscuring aspects of the disclosure.

Definitions

In the following description, certain terminology is used to describe certain features of the embodiments of the in-water refueling system in accordance with the present disclosure. For example, as used herein, unless otherwise specified, the term "substantially" refers to the complete, or nearly complete, extent or degree of an action, characteristic, property, state, structure, item, or result. As an arbitrary example, an object that is "substantially" surrounded would mean that the object is either completely surrounded or nearly completely surrounded. The exact allowable degree of deviation from absolute completeness may in some cases depend on the specific context. However, generally speaking, the nearness of completion will be so as to have the same overall result as if absolute and total completion were obtained.

The use of "substantially" is equally applicable when used in a negative connotation to refer to the complete or near complete lack of an action, characteristic, property, state, structure, item, or result. As another arbitrary example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "approximately" may refer to a range of values of ±10% of a specific value. For example, the expression "approximately 150 inches" may comprise the values of 150 inches ±10%, i.e. the values from 135 inches to 165 inches.

As used herein, the term "about" is used to provide flexibility to a numerical range endpoint by providing that a given value may be "a little above" or "a little below" the endpoint. In some cases, the term "about" is to include a range of not more than about two inches of deviation.

As used herein in this disclosure, the singular forms "a" and "the" may include plural referents, unless the context clearly dictates otherwise. Thus, for example, reference to an "opening" can include reference to one or more of such openings.

As used herein in this disclosure, reference to "UUVs with fuel cell propulsion" may be used interchangeably with "undersea stationary fuel cells," wherein the pertinent commonality between the two being that each has at least one hydrogen gas fuel storage tank and/or oxygen gas oxidizer storage tank. Therefore, reference to "in-water refueling of UUVs with fuel cell propulsion" may be used interchangeably with "in-water refueling of undersea stationary fuel cells."

The present disclosure relates generally to refueling systems, and more particularly, to refueling systems for in-water refueling of UUVs with fuel cell propulsion. The in-water refueling system disclosed herein preferably prevents or minimizes hazards associated with the production, storage, gas management, and dispensing of high-pressure hydrogen and oxygen gases. In particular, hydrogen gas and oxygen gas may be supplied as a fuel and oxidizer, respectively, for UUVs utilizing fuel cell propulsion and, in general, must be handled with care due to its flammable and explosive properties. Otherwise, hydrogen gas can ignite and explode when in contact with oxygen gas. In other cases, hydrogen gas may even cause burns when in the presence of an oxidizer. As a result, in order to prevent ship damage or bodily injury, compressed hydrogen and oxygen gases are usually not stored on ships onboard.

In order to solve the problems associated with producing, storing, gas management, and dispensing high-pressure hydrogen and oxygen gases for refueling UUVs with fuel cell propulsion, embodiments of the in-water refueling system disclosed herein may refuel a UUV at a standoff distance outside the ship or vessel and preferably underwater. Specifically, the in-water refueling system may be deployed outside the ship and may refuel the UUV in-water, creating a water boundary in the event of a fire or an explosion. In this manner, embodiments of the in-water refueling system may minimize any hazards associated with the production, storage, gas management, or dispensing of high-pressure hydrogen and oxygen gases during refueling of UUVs utilizing fuel cell propulsion. Specifically, any hydrogen and oxygen gases that are unused in either the in-water refueling system or in the UUV may be removed by venting to the atmosphere before return to the ship for transport onboard.

In its basic configuration, embodiments of the in-water refueling system may comprise a tank and a main pump for delivering liquid into the interior space of the tank. The liquid is preferably water suitably deionized for use in a polymer exchange membrane electrolysis stack assembly and may be delivered from a liquid storage bladder or water bladder. Upon filling the interior space of the tank with liquid, the main pump may further deliver and compress liquid into the tank, thereby elevating the pressure of the liquid within the interior space of the tank. The in-water refueling system may further comprise: an electrolysis stack assembly for converting the liquid within the tank into one or more gases (e.g., hydrogen gas and oxygen gas), a secondary submersible pump for delivering liquid through the electrolysis stack assembly, a temperature sensor in communication with the electrolysis stack assembly to activate or inactivate the electrolysis stack assembly, a pressure sensor in communication with the main pump for regulating the (1) flow of liquid into the tank and (2) pressure of hydrogen gas and oxygen gas in equilibrium with the liquid, two open-bottom cylinders for storing and dispensing hydrogen gas and oxygen gas, two outlet supply lines for transferring hydrogen gas and oxygen gas from the electrolysis stack assembly to the two open-bottom cylinders, two dispense lines for transferring the hydrogen gas and oxygen gas from the two open-bottom cylinders to the outside of the tank, and valves located on the dispense lines for regulating the transfer of hydrogen gas and oxygen gas from the open-bottom cylinders to the UUV for (1) operation of cascade storage refilling a hydrogen gas/oxygen gas storage tank, (2) refueling a UUV with fuel cell propulsion, or (3) venting the hydrogen or oxygen gas from the open-bottom cylinders to the atmosphere. Each open-bottom cylinder may also comprise a float sensor for determining the amount of fluid within the open-bottom cylinder based on density and limit switches for controlling the valve openings and the gas production of the electrolysis stack assembly. Because gas is less dense than liquid, the gas generally accumulates above the liquid within the open-bottom cylinder. In this manner, a feedback controller may control the rate of gas evolution by the electrolysis stack assembly to equal the rate of gas dispensing through the valves.

FIG. 1 illustrates a perspective view of one embodiment of an in-water refueling system 100 for refueling UUVs with fuel cell propulsion, in accordance with the present disclosure. As shown in FIG. 1, one embodiment of the in-water refueling system 100 may comprise a tank 105, main pump 110, liquid storage bladder 115, motor 120, controller 125, and cage 130.

The tank 105 may be any fluid tight structure having an interior space 106 (shown in FIG. 2) particularly suited for holding and storing a fluid, liquid, gas, or other substance. The tank 105 may be a hyperbaric tank adapted to withstand high fluidic pressure and may also comprise one or more openings for coupling or fitting various components. For example, as shown in FIG. 1, the in-water refueling system 100 may comprise a main pump 110 and dispense lines 140, 141, all of which may couple to the openings of the tank 105. In particular, the outlet 175 of the main pump 110 may be fitted and sealably attached to a bottom opening of the tank 105, whereas the dispense lines 140, 141 may be fitted and sealably attached to top openings of the tank 105.

In various embodiments, the tank 105 may be constructed of any metal or high durable material such as steel and aluminum but may also be constructed from other suitable materials such as fiberglass or plastic. Alternatively, the tank 105 may be constructed of a composite structure such as carbon fiber wrapped aluminum and polymer liners. In an exemplary embodiment, the tank 105 may also comprise a liner to serve as a gas permeation barrier in order to prevent leaking of a fluid, liquid, gas, or other substance. Embodiments of the liners may be constructed of carbon fiber wrapped aluminum. For example, in one embodiment, the tank 105 may be a Type 3 cylinder, which is preferably a high-pressure cylinder constructed with an all-aluminum liner fully overwrapped with layers of carbon fiber. In an alternative embodiment, the tank 105 may be a Type 4 cylinder, which is preferably a high-pressure cylinder with a polymer liner. Examples of such tanks 105 and liners may be those manufactured by Luxfer, Inc. (manufacturer part number A2085C-001).

Figure 2:
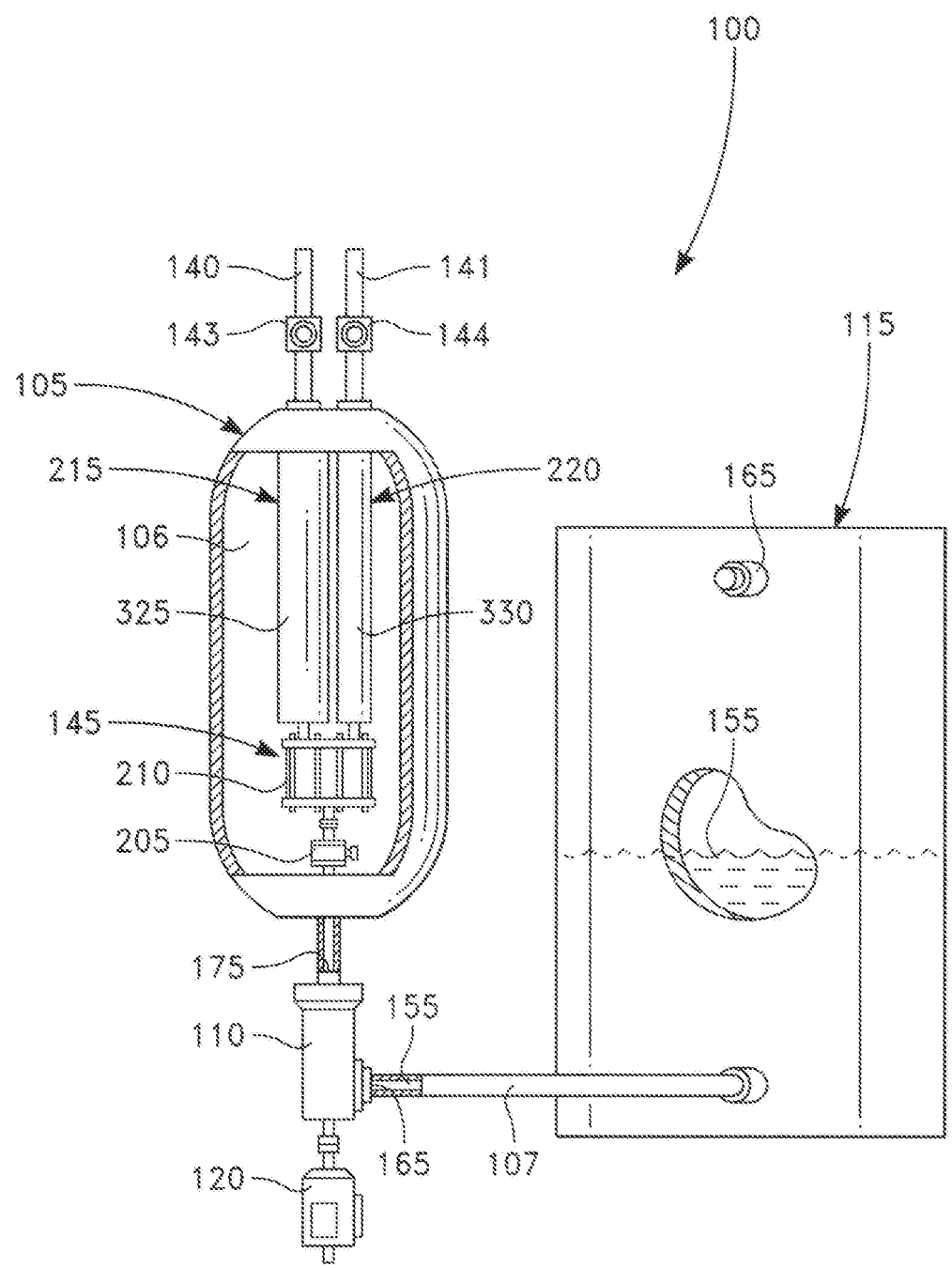
FIG. 2 illustrates a perspective view of a portion of one embodiment of the in-water refueling system and shows the inner components of the tank

In various embodiments, portions of the tank polymer liner may also be manufactured via additive manufacturing or injection molding prior to carbon fiber wrapping in order to withstand burst pressure. The tank polymer liner may be constructed of two pieces, as for example, an upper cylindrical portion and a lower cylindrical portion, adapted to couple or join together. Preferably, within the upper cylindrical portion of the tank polymer liner, extrusions may implement the open-bottom cylinders 215, 220 (shown in FIG. 2). Within the lower cylindrical portion of the tank polymer liner, mounts or extrusion may also be implemented for mounting other various components such as the electrolysis stack assembly 145 and secondary submersible pump 205, all of which are shown in FIG. 2.

FIG. 1 also shows that the in-water refueling system 100 may also comprise a liquid storage bladder 115, which may be any fluid storage device used as a source for supplying liquid to the main pump 110 and tank 105. In a preferred embodiment, the liquid storage bladder 115 may be a water bladder or chamber having an inner volume when expanded and less inner volume when collapsed. In an exemplary embodiment, the liquid storage bladder 115 may also be a water bladder used for storing water with low conductivity, as for example, maintaining the integrity of water that has been suitably deionized for use in an electrolysis stack assembly 145. While FIG. 1 shows the in-water refueling system 100 having a liquid storage bladder 115, other embodiments of the in-water refueling system 100 may function without a liquid storage bladder 115 and thus may obtain liquid from other sources, as for example from a second tank FIG. 1 also shows that the in-water refueling system 100 may further comprise a main pump 110, which may be any device that moves or transfers fluids into the interior space 106 of the tank 105 via mechanical action. The main pump 110 may comprise an inlet 165 and an outlet 175, wherein the outlet 175 may be in fluid communication with the interior space 106 of the tank 105 and the inlet 165 may be in fluid communication with the liquid storage bladder 115. In this manner, fluid stored in the liquid storage bladder 115 may flow through the main pump 110 and into the interior space 106 of the tank 105.

In various embodiments, the main pump 110 may be a positive displacement pump such as a rotary screw pump, such as the one shown in FIG. 1. The rotary screw pump may also employ one or several screws to move fluids along the axis of the screw(s). An embodiment of the main pump 110 is preferably a multi-phase or twin-screw pump suitable for pumping liquid water, as for example those manufactured by ITT Bornemann GmbH.

Importantly, as mentioned above, the in-water refueling system 100 may also comprise an electrolysis stack assembly 145 for dissociating a compound liquid into its components via electrolysis. Here, the electrolysis stack assembly 145 may be situated within the tank 105 and may separate the fluid stored in the tank 105 into gaseous components. The resulting gaseous components may then be outputted through various inner components of the tank 105 and ultimately the dispense lines 140, 141. For example, in a preferred embodiment, the electrolysis stack assembly 145 may dissociate water into hydrogen gas and oxygen gas to generate high-pressure hydrogen gas and oxygen gas without using gas compressors. An example of an electrolysis stack assembly 145 used by the in-water refueling system 100 to dissociate liquid water into hydrogen and oxygen gases may be the Merrimack electrolysis stack manufactured by Giner ELX (manufacturer part number EHP-0300-5999).

FIG. 1 also depicts the in-water refueling system 100 having a controller 125 for regulating the operation of the in-water refueling system 100 components. For instance, the controller 125 may be a feedback controller for regulating water supplied to the tank 105 as well as hydrogen gas and oxygen gas present within the tank 105 that is at substantially the same pressure as the water. In particular, the controller 125 may obtain pressure readings from a pressure sensor 405 (shown in FIG. 4) via a pressure sensor line 406 and use those pressure readings as a feedback signal, which may serve as a control signal to the main pump 110. By way of example, in an embodiment when the main pump 110 is a screw-pump, to regulate the flow of liquid by the main pump 110, a variable frequency drive (VFD) controller 410 (shown in FIG. 4) may obtain the pressure readings from the pressure sensor 405 and thus control the fluid pressure of the tank 105. In this embodiment, if the fluid pressure falls below a predetermined lower limit, the VFD controller 410 may increase the fluid pressure, thereby operating the main pump 110 in the forward direction via the motor 165 and compressing fluid into the interior space 106. Conversely, using this same embodiment where the main pump 110 is a screw-pump, if the measured fluid pressure rises above a predetermined upper limit, the VFD controller 410 may lower the fluid pressure by operating the main pump 110 in the reverse direction via the motor 165, thereby removing fluid from within the interior space 106. Various control algorithms may be implemented to regulate the fluid pressure using the pressure readings from the pressure sensor 405. Accordingly, the pressure sensor 405 may monitor and measure the fluid pressure within the tank 105, thereby serving as a suitable proxy for regulating the fluid supplied to the tank 105 via the main pump 110.

Similarly, the controller 125 may also comprise a temperature sensor 407 (shown in FIG. 4) for obtaining temperature measurements. The temperature measurements may be used as a feedback and control signal to effectively regulate the temperature within the tank 105. In particular, the controller 125 may further comprise a flow meter 415 (shown in FIG. 4) configured to adjust the flow of liquid into the electrolysis stack assembly 145, based on temperature readings via the secondary submersible pump 205—a pump designed for delivering liquid through the electrolysis stack assembly 145 at a rate, in accordance to the manufacture specification of draw of electrical power and hydrogen gas/oxygen gas production rate. Thus, in this manner, the temperatures sensor 407 may communicate with the electrolysis stack assembly 145 to shut on/off, in accordance with the manufacture specification of temperature operating range. Thus, the temperatures sensor 407 may maintain the fluid throughput for the electrolysis stack assembly 145 within normal operating ranges (i.e., somewhat above freezing point and somewhat below boiling point of the liquid). Additionally, depending on the rate of gas production by the electrolysis stack assembly 145 and its associated rate of heat generation, the fluid stored in the tank 105 may optionally include various means for conducting heat transfer. For example, the walls of the entire tank 105 (or portion thereof) may be constructed of a conductive material. Alternatively, the tank 105 may be configured for convective heat transfer (i.e., cooling tubes that transfer lower temperature fluid into and outside the tank 105 may remove heat from the fluid stored in the interior space 106 of the tank.

Finally, FIG. 1 shows that the in-water refueling system 100 may comprise a cage 125, which may be any structure used to enclose, house, or loosely confine components of the in-water refueling system 100. Various embodiments of the cage 125 may be somewhat open, such that a user may easily access various components of the in-water refueling system 100. Other embodiments of the cage 125 may substantially confine the components to make them inaccessible from outside users.

Other embodiments of the in-water refueling system 100 may further comprise additional components such as sensors for managing the process flow of fluids, liquids, and gases. For example, additional sensors of the in-water refueling system 100 may include gas component fraction sensors to monitor the gas fraction for the purpose of revealing combustible mixtures. Other additional components may also include pressure relief devices for preventing or relieving pressure.

FIG. 2 illustrates a perspective view of a portion of one embodiment of the in-water refueling system 100 and shows the inner components of the tank 105. FIG. 2 also depicts, in cutaway view portions, water 155 (e.g., deionized water) being used as a fluid stored within the liquid storage bladder 115, piping 107, and tank 105. As shown in FIG. 2, an embodiment of the tank 105 may comprise open-bottom cylinders 215, 220, an electrolysis stack assembly 145, and a secondary submersible pump 205.

Specifically, FIG. 2 depicts the tank 105 having an interior space 106, which may be defined by a cylindrical wall. The size of the interior space 106 may also be affected by the placement of the inner components of the tank 105. In particular, the outlet 175 of the main pump 110 may be sealably coupled to the bottom opening of the tank 105 and may allow fluid to enter or leave the tank 105 via the main pump 110. Additionally, the open-bottom cylinders 215, 220 may be sealably coupled at or near the ceiling of the tank 105 and may have a cylindrical body 325, 330 substantially disposed within the interior space 106 of the tank 105. The top portion of the open-bottom cylinders 215, 220 may also be in fluid communication with the dispense lines 140, 141 located above and outside the tank 105. The electrolysis stack assembly 145, which is also preferably located within the tank 105, is preferably disposed between the open-bottom cylinders 215, 220 and the secondary submersible pump 205. In this manner, the electrolysis stack assembly 145 may be in fluid communication with the interior space 106 of the tank 105 to perform electrolysis on the fluid stored in the tank 105. In order to supply gases such as hydrogen gas and oxygen gas, fuel lines may be connected to the dispense lines 140, 141 outside the tank 105 via valves 143, 144.

In one embodiment, the electrolysis stack assembly 145 may receive water through the end plate to its electrolysis cells. In operation, application of a direct current (DC) potential difference between the end plates of the electrolysis stack assembly 145 may then dissociate the water via electrolysis to generate hydrogen and oxygen. The hydrogen and oxygen thus evolved may be fed through outlet supply lines 314, 319 (shown in FIG. 3) into the cylinder space 315, 320 (shown in FIG. 3) of the open-bottom cylinders 215, 220 and then later release through the dispense lines 140, 141 or fuel lines via the valves 143, 144. Given that electrolysis of water produces double the amount of hydrogen than oxygen molecules, the first open-bottom cylinder 215 may be about twice the size than cylinder 220 in order to accommodate the larger amount of hydrogen molecules, as shown in FIG. 2. In particular, the volume of hydrogen and oxygen inside the open-bottom cylinders 215, 220 may be maintained substantially unchanged during operation of the electrolysis stack assembly 145 and at substantially constant pressure by partially opening the valves 143, 144 such that the rate of gas evolution by the electrolysis stack assembly 145 equals the rate of gas dispensing through the valves 143, 144. The valves 143, 144 may be solenoid activated valves or proportional control piezo-actuated valves such as those manufactured by Marotta Controls.

Figure 3:
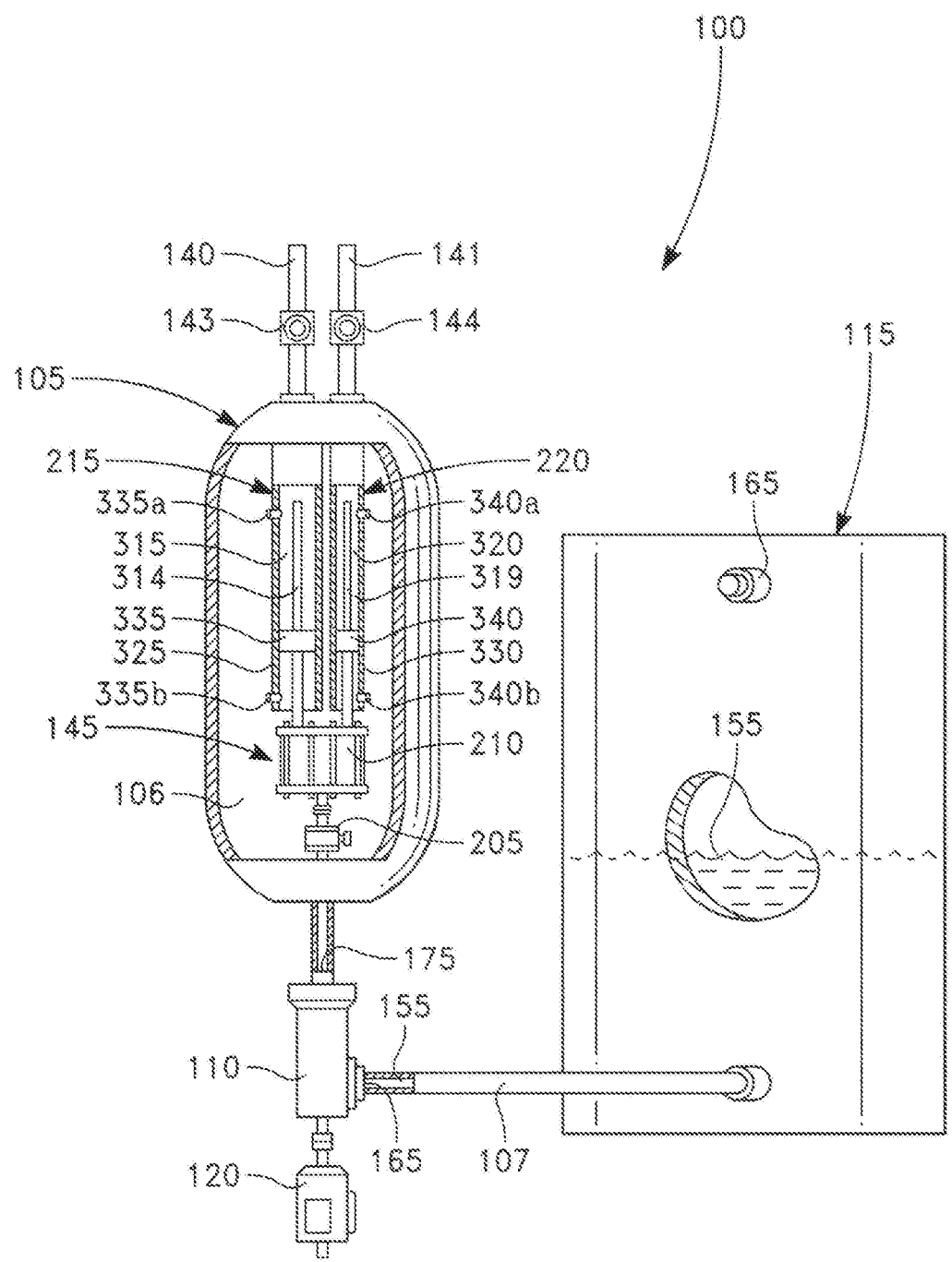
FIG. 3 illustrates a perspective view of one embodiment of the in-water refueling system and shows the inner components of the cylinders.

FIG. 3 illustrates a perspective view of one embodiment of the in-water refueling system 100 and shows the inner components of the open-bottom cylinders 215, 220 via partial cross section views. Specifically, FIG. 3 shows that each of the open bottom cylinders 215 may comprise a cylindrical body 325, 330 and float sensor 335, 340. The float sensors 335, 340 may be disposed within the cylinder space 315, 320 and may be configured to move in a vertical manner relative to the outlet supply lines 314, 319. Importantly, the float sensors 335, 340 may be used to determine the fluid level stored within the cylinder space 315, 320 based on the differing densities between the fluid and gas. In particular, the float sensors 335, 340 may move vertically up and down between two limit switches (i.e., upper limit switches 335a, 340a, bottom limit switches 335b, 340b). Contact of the float sensor 335, 340 with the upper limit switch 335a, 340a may indicate that the corresponding open-bottom cylinder 215, 220 is depleted of stored gas and filled with liquid. This in turn may cause the upper limit switch 335a, 340a to send a signal, which may (1) close the respective valve 143, 144 to prevent further delivery of liquid from within the open-bottom cylinder 215, 220 through the dispense line 140, 141 and/or (2) activate the electrolysis stack assembly 145 to produce more gases. Similarly, contact of the float sensor 335, 340 with the bottom limit switches 335b, 340b may indicate that the corresponding open-bottom cylinder 215, 220 is filled with stored gas. This in turn may cause the upper limit switch 335a, 340a to send a signal, which may (1) open the respective valve 143, 144 to prevent gas from leaving the bottom of the corresponding open-bottom cylinder 215, 220 by releasing gas through the dispense lines 140, 141 and/or (2) inactivate the electrolysis stack assembly 145 to halt production of the gases. In various embodiments, the float sensors 335, 340 may also include a linear transducer to determine the exact measurement of gas stored within the open-bottom cylinders 215, 220. In a preferred embodiment, as previously described, the exact volume of hydrogen and oxygen inside the open-bottom cylinders 215, 220 determined by the float sensors 335, 340 may be both established and maintained substantially unchanged by providing feedback to the controller 125 and using that feedback to determine and partially control the opening of the valves 143, 144. In this manner, the rate of gas evolution by the electrolysis stack assembly 145 preferably equals to the rate of gas dispensing through the valves 143, 144.

For example, within the cylinder space 315, 320, gases such as hydrogen or oxygen may enter via the outlet supply lines 314, 319 and may accumulate within the top portion of the cylinder space 315, 320. From there, the accumulated gas may reposition the float sensor 335, 340 and may escape through the dispense lines 140, 141 upon opening of the valves 143, 144. In particular, the first outlet supply line 314 may traverse or extend towards the upper area of the first cylinder space 315, so as to allow gas (e.g., hydrogen) to accumulate initially in the upper area of the first cylinder space 315 and exit the first dispense line 140 or first fuel line. Similarly, the second outlet supply line 319 may traverse or extend towards the upper area of the second cylinder space 320, so as to allow gas (e.g., oxygen) accumulate initially in the upper area of the second cylinder space 320 and exit the second dispense line 141 or second fuel line. In other embodiments, the first outlet supply line 314 and second outlet supply line 319 may extend around the mid-section of the cylinder space 315, 320 to allow gas to exit and accumulate initially in the mid-area of the cylinder space 315, 320. Due to the varying pressure between the inner and outer areas of the open-bottom cylinders 215, 220, the open-bottom cylinders 215, 220 need not be constructed of high strength materials, and thus, may be constructed of other suitable materials such as polymers, composites, and the like FIG. 3 also shows that, due to the bottom openings of the open-bottom cylinders 215, 220, the fluid entering the interior space 106 of the tank 105 may also enter within the cylinder space 315, 320 of the open-bottom cylinders 215, 220. Specifically, as shown in FIG. 3, the open-bottom cylinders 215, 220 may include bottom openings, which allow fluids within the tank 105 to enter or leave the open-bottom cylinders 215, 220. The first open-bottom cylinder 215, for instance, may accumulate and store hydrogen, while the tank 105 receives or stores water. As a result, water may enter or leave the cylinder space 315 through the bottom opening of the open-bottom cylinder 215, and due to their differing densities (i.e., water generally has a higher density than hydrogen), the hydrogen and water may be physically separated. Finally, FIG. 3 also shows that an embodiment of a main pump 110 as a screw-pump may allow fluid to enter and leave the tank 105. The accumulation or removal of fluid may increase or decrease the volume of the tank 105, thereby affecting the fluid pressure of the tank 105. Thus, because the fluid and gas may interact within the cylinder space 315, 320, pressure equilibrium within the open-bottom cylinders 215, 220 may be achieved.

During operation, a power supply 420 (shown in FIG. 4) may provide direct current voltage to the electrolysis stack assembly 145, and the secondary submersible pump 205 may drive fluid into electrolysis stack assembly 145 to electrochemically dissociate the fluid. As a result, the chemical products of reaction may be produced such as hydrogen ions, electrons, and oxygen. The hydrogen ions, which may be protons, may be electrochemically reduced to hydrogen molecules when the ionized hydrogen atoms are electrochemically consumed in a reaction involving the cathode electrode. The hydrogen molecules may then be drawn out through the first outlet supply line 314 and into the cylindrical space 315 of the open bottom cylinder 215. Within the cylindrical space 315, the fluid pressure created by the water and the gas pressure created by the hydrogen molecules may reach equilibrium, thereby dispensing the hydrogen stored within the cylindrical space 315 through the dispense line 140. Similarly, oxygen molecules may be drawn out through the second outlet supply line 319 and into the cylindrical space 320 of the open bottom cylinder 220. There, the fluid pressure created by the water and the gas pressure created by the oxygen molecules may also reach equilibrium, thereby dispensing the oxygen stored within the cylindrical space 320 through the dispense line 141.

Figure 4:
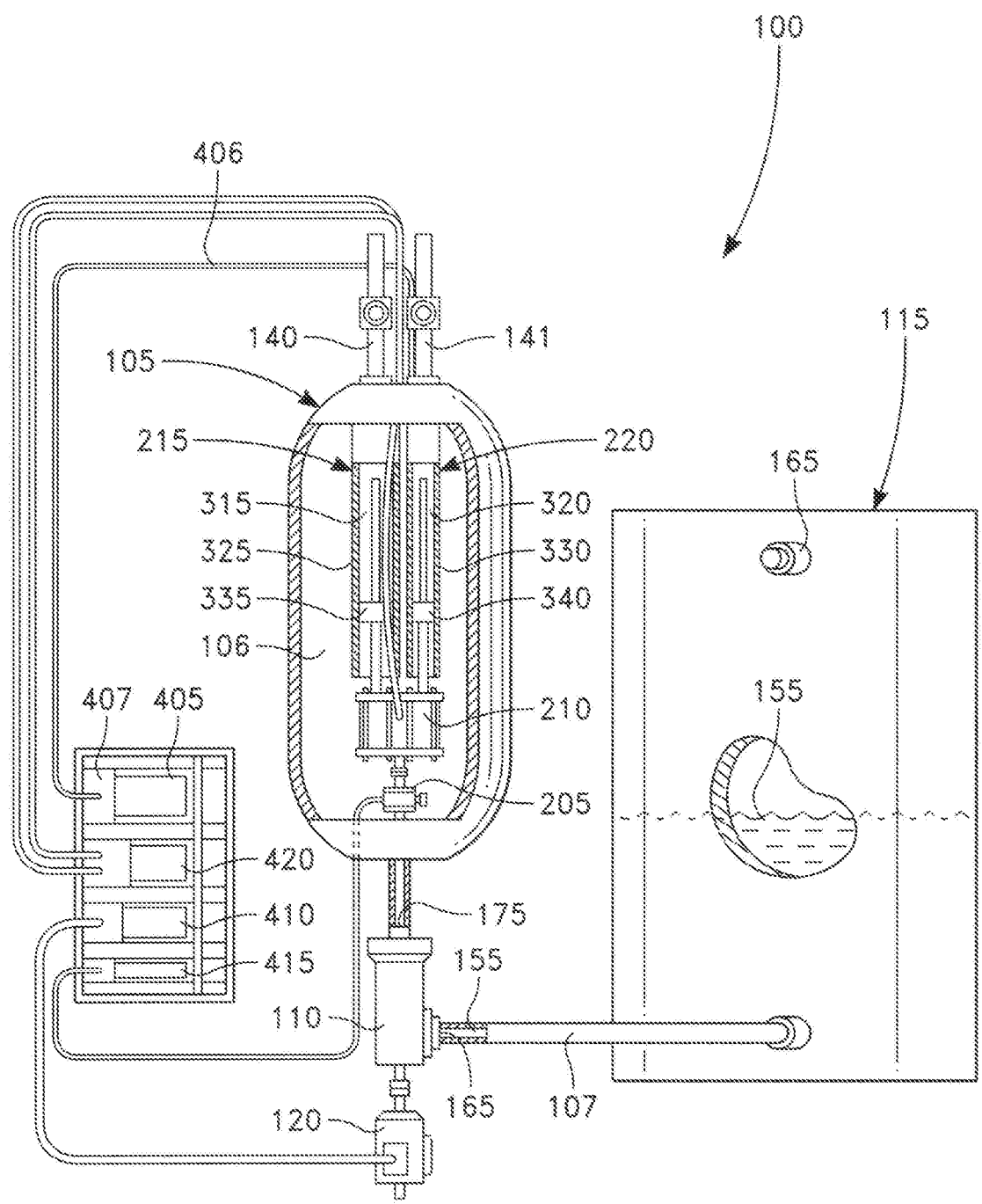
FIG. 4 illustrates a perspective view of one embodiment the in-water refueling system and shows the controller in more detail.

FIG. 4 illustrates a perspective view of one embodiment the in-water refueling system 100 and shows the controller 125 in more detail. As shown in FIG. 4, one embodiment of the controller 125 may comprise: a pressure sensor 405, temperature sensor 407, power supply 420, VFD 410, and flow meter 415.

The pressure sensor 405 and temperature sensor 407 may be devices or components capable of measuring temperature and pressure within the tank 105, respectively. The pressure sensor 405 and temperature sensor 407 preferably monitor the interior space 106 of the tank 105 via pressure sensor line 406 and may provide feedback to the VFD 410 to regulate pressure and temperature within the tank 105. In this manner, the in-water refueling system 100 may maintain constant fluid pressure when dispensing hydrogen or oxygen gases by replacing water at a rate that gas leaves.

The power supply 420 may be device or component that supplies power to the in-water refueling system 100. The power supply 420 preferably provides power to various components of the in-water refueling system 100 (e.g., main pump 110, electrolysis stack assembly 145, secondary submersible pump 205), and in various embodiments, each of these components may also include a separate power supply for converting the supplied power to the correct voltage, current, and/or frequency in order to power the components.

The VFD 410 may be an adjustable-speed drive used to control or regulate the motor speed and torque of the motor 120. In particular, the VFD 410 may vary the motor input frequency and voltage in order to control the speed of the motor 120. Thus, the VFD 410 may regulate the amount of fluid entering the tank 105. As discussed above, the motor input frequency may be adjusted based on the pressure measurements obtained by the pressure sensor 405, thereby maintaining constant fluid pressure within the tank when dispensing gases. Additionally, in an embodiment where the main pump 110 is a screw-pump, the VFD 410 may toggle the rotational direction of the motor 120 between forward and reverse and adjust the speed of the rotation. In this manner, the main pump 110 may regulate pressure by adding or compressing liquid into the tank interior space 106 or removing liquid from within the tank interior space 106, respectively.

The flow meter 415 may be an instrument used for measuring the volumetric flow rate of a liquid or gas. Based on the temperature measurements obtained by the temperature sensor 407, the flow meter 415 may adjust the pumping action of the secondary submersible pump 205 to control the amount of heat generated by the electrolysis stack assembly 145. The flow meter 415 may also inactivate the electrolysis stack assembly 145 when the water temperature is outside the manufacturer specification of temperature operating range.

Figure 5:
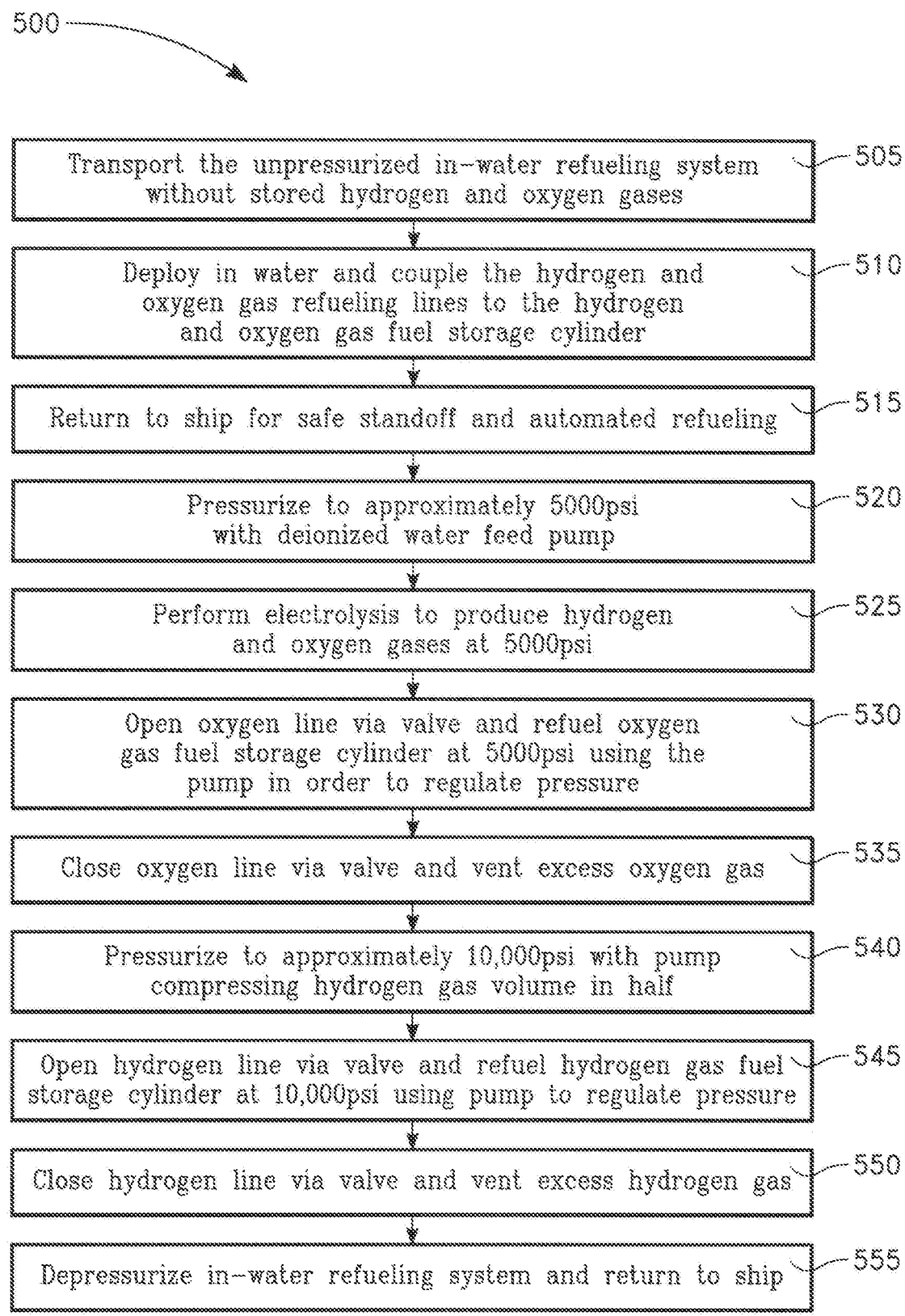
FIG. 5 depicts a flow chart of one embodiment of a method for refueling a UUV using the in-water refueling system.

FIG. 5 depicts a flow chart of one embodiment of a method 500 of refueling a UUV using the in-water refueling system 100. As mentioned above, crewmen of ships have safety concerns relating to high-pressurized gases carried on ships. These hazards relate to possible explosions when transporting and mishandling high pressure hydrogen and oxygen gases for refueling UUVs. Thus, it would be desirable to have a safe operating procedure or method to relieve safety concerns. As a result, FIG. 5 depicts a method 500 for safe UUV refueling using the in-water refueling system 100. Preferably, the in-water refueling system 100 performs refueling at a pressure of 10,000 psi for hydrogen gas and 5000 psi for oxygen gas.

As shown in FIG. 5, one embodiment of the method 500 may comprise steps 505, 510, 515, 520, 525, 530, 535, 540, 545, 550, 555. In these steps, the term "valve" is used generically to mean one or several flow devices necessary to effect the transfer by pressure difference of hydrogen and oxygen gases from within the in-water refueling system 100 to its respective gas fuel storage cylinder via a fuel transfer line. For example, the term "valve" may include valves 143, 144 of the in-water refueling system 100 and additional valves located at the inlet to the fuel storage cylinders, such that when either valves 143, 144 is operated to open or close, its respective valve at the inlet to the fuel storage cylinder is operated to open or close in unison. Yet an additional valve may be located in the dispense line 140, 141 to effect venting gas to the atmosphere or for use in purging the refueling line and gas storage cylinder of unwanted residual gases, in particular air. FIG. 5 demonstrates that transfer of hydrogen and oxygen gaseous fuel during refueling operations may be effected at different hydrogen and oxygen gas refueling pressures.

Turning to the method 500, at step 505, the unpressurized in-water refueling system 100 is preferably transported to a desired location for refueling without any stored hydrogen or oxygen gases. This may prevent or minimize any hazards during transport or non-routine operations. For example, a ship transporting the unpressurized in-water refueling system 100 without stored gases to a desired location at sea for UUV operation may prevent the risk of explosion due to mishandling of stored hydrogen gas.

Upon arriving at the desired location at sea, the in-water refueling system 100 at step 510 may be deployed in-water. There, the refueling lines may be coupled to the gas fuel storage cylinders of the UUV. For example, the hydrogen and oxygen refueling lines of the in-water refueling system 100 may be coupled to the hydrogen and oxygen gas fuel storage cylinders of the UUV. In this manner, hydrogen or oxygen may be provided to the UUV for refueling.

At step 515, the user preferably returns to ship for safe stand-off and automated refueling. Then, at step 520, user may then pressurize the tank 105 to 5000 psi with deionized water. Here, the deionized water, which may be stored in the liquid storage bladder 115, may then be fed to the tank 105 via the main pump 110 in order to perform electrolysis.

At step 525, the in-water refueling system 100 may perform electrolysis on the deionized water, creating hydrogen and oxygen gases. In an exemplary embodiment, the hydrogen gas may be produced at 10,000 psi, whereas the oxygen gas may be produced at approximately 5000 psi.

After creating the oxygen and hydrogen gases, the oxygen refuel line may be open by opening the valve 144, as shown in step 530, in order to refuel the oxygen gas fuel storage cylinder. This may be performed with the main pump 110 at 5000 psi in order to regulate pressure within the tank 105. Upon completing the refueling of oxygen gas, the oxygen line may be closed by turning the valve 144 to its original position, as shown in step 535. For any remaining oxygen gas created and stored within the in-water refueling system 100, the unused, excess oxygen is preferably vented through dispense line 141.

Turning to step 540, the tank 105 is preferably pressurized to approximately 10,000 psi with main pump 110, and the volume of the hydrogen gas is preferably compressed in half. Thus, in step 545, the hydrogen line may be open via valve 143 in order to refuel the hydrogen gas fuel storage cylinder. This may be performed with the main pump 110 at 10,000 psi in order to regulate pressure within the tank 105. Upon completing the refueling of hydrogen gas, the hydrogen line may be closed by turning the valve 143 to its original position, as shown at step 550. For any remaining hydrogen gas created and stored within the in-water refueling system 100, the excess hydrogen gas may be vented through the dispense line 140.

After completing the refueling process for the UUV using both hydrogen and oxygen gases, the in-water refueling system 100 is preferably depressurized and returned to the ship, as shown in step 555.

Embodiments of the in-water refueling system 100 provide various benefits, including increased safety and increased refueling speed. Specifically, when using water as the stored liquid, the in-water refueling system 100 increases safety by having the water serve as a boundary to the open-bottom cylinders 215, 220. This will likely prevent the combustible gases stored within the open-bottom cylinders 215, 220 (e.g., hydrogen) to interact with the stored oxygen or air. In particular, gas mixture of hydrogen and air having hydrogen flammability limits of 3% to 77% may be affected by the water. The ignition of the combustible mixture might result with heat generation, as the hydrogen fuel is consumed in reaction to oxygen. As a result, the heat may vaporize the water that is serving as the bottom boundary to the open-bottom cylinders 215, 220 and thus will likely suppress or extinguish any propagation of flames or explosion. As such, this arrangement generally serves as a fire suppression system, thereby resulting in increased safety.

Embodiments of the in-water refueling system 100 also generally provide the added benefit of increased refueling speed. Here, hydrogen gas generally rises in temperature when the hydrogen gas transfers from a high pressure tank to a low pressure tank. This generally requires pre-cooling of the hydrogen gas line connecting the tanks in order to achieve rapid refueling. In general, rapid refueling takes approximately 10-15 minutes, as opposed to 1 hour without the pre-cooling. Thus, another advantage of the in-water refueling system 100 is that within the high pressure tank 105, the hydrogen gas is generally in contact with water, which typically serves as a suitable heat exchange medium. As such, the in-water refueling system 100 can decelerate or minimize the temperature rise, thereby reducing the need for pre-cooling and other means of refrigeration.

Although the in-water refueling system 100 disclosed above may be configured for a ship or vessel, the in-water refueling system 100 may be used with other sea vessels including submarines. Other embodiments of the in-water refueling system 100 may also be configured for use on surface, deep ocean, land, and space. Additionally, various configurations of the gases generated and stored may include: oxygen only, hydrogen only, and hydrogen and oxygen gases.

The foregoing description of the embodiments of the in-water refueling system has been presented for the purposes of illustration and description. While multiple embodiments are disclosed, other embodiments will become apparent to those skilled in the art from the above detailed description. As will be realized, these embodiments are capable of modifications in various obvious aspects, all without departing from the spirit and scope of the present disclosure. Accordingly, the detailed description is to be regarded as illustrative in nature and not restrictive.

Although embodiments of the in-water refueling system are described in considerable detail, other versions are possible. Therefore, the spirit and scope of the appended claims should not be limited to the description of versions included herein.

Except as stated immediately above, nothing which has been stated or illustrated is intended or should be interpreted to cause a dedication of any component, step, feature, object, benefit, advantage, or equivalent to the public, regardless of whether it is or is not recited in the claims. The scope of protection is limited solely by the claims that now follow, and that scope is intended to be broad as is reasonably consistent with the language that is used in the claims. The scope of protection is also intended to be broad to encompass all structural and functional equivalents.

What is claimed as new and desired to be protected by Letters Patent is set forth in the appended claims:

1. An in-water refueling system for unmanned undersea vehicles (UUV) with fuel cell propulsion, comprising:
    a tank having an interior space;
    a main pump having an outlet that is sealably coupled to a first opening of said tank and in fluid communication with said interior space;
    one or more open-bottom cylinders disposed within said tank and each comprising:
        a cylindrical body sealably coupled to one or more second openings of said tank and having a cylindrical space in fluid communication with said interior space of said tank; and
        a float sensor adapted to raise and lower via buoyancy;
    one or more dispense lines disposed outside said tank and sealably coupled to said one or more second openings of said tank, such that said one or more vent lines are in fluid communication with said one or more cylindrical spaces;
    a secondary submersible pump disposed within said tank for pumping a liquid in said interior space; and
    an electrolysis stack assembly disposed within said tank and adapted to produce one or more gases, said electrolysis stack assembly comprising:
        one or more electrolysis stacks for converting said liquid into said one or more gases;
        an inlet in fluid communication with said secondary submersible pump; and
        one or more outlet supply lines traversing into said one or more cylindrical spaces through one or more bottom openings of said one or more open-bottom cylinders for releasing said one or more gases into said one or more cylindrical spaces.

2. The in-water refueling system recited in claim 1, further comprising a controller having a temperature sensor and a pressure sensor for determining a temperature and a fluid pressure within said tank, respectively.

3. The in-water refueling system recited in claim 1, characterized in that said one or more dispense lines comprise one or more valves configured to operably couple to one or more fuel lines.

4. The in-water refueling system recited in claim 1, characterized in that said one or more gases are hydrogen and oxygen.

5. The in-water refueling system recited in claim 1, further comprising a liquid storage bladder in fluid communication with an inlet of said main pump.

6. The in-water refueling system recited in claim 1, further comprising a motor operably coupled to said main pump.

7. An in-water refueling system for UUVs with fuel cell propulsion, comprising:
    a tank having a first opening, at least two second openings, and an interior space;
    a main pump having an outlet sealably coupled to said first opening of said tank and in fluid communication with said interior space;
    a first open-bottom cylinder, comprising:
        a first cylindrical body sealably coupled to one of said at least two second openings and having a first cylindrical space in fluid communication with said interior space; and
        a first float sensor adapted to raise and lower via buoyancy;
    a second open-bottom cylinder, comprising:
        a second cylindrical body sealably coupled to another of said at least two second openings of said tank and having a second cylindrical space in fluid communication with said interior space; and
        a second float sensor adapted to raise and lower via buoyancy;
    first and second dispense lines disposed outside said tank and sealably coupled to said at least two second openings of said tank, such that said first and second dispense lines are in fluid communication with said first and second cylindrical spaces;
    a secondary submersible pump disposed within said tank for pumping a liquid in said interior space; and
    an electrolysis stack assembly disposed within said tank and adapted to produce first and second gases, said electrolysis stack assembly comprising:
        an electrolysis stack for converting said liquid into said first and second gases;
        an inlet in fluid communication with said secondary submersible pump;
        a first outlet supply line traversing into said first cylindrical space for releasing said first gas into said first cylindrical space; and
        a second outlet supply line traversing into said second cylindrical space for releasing said second gas into said second cylindrical space.

8. The in-water refueling system recited in claim 7, further comprising a controller having a temperature sensor and a pressure sensor for determining a temperature and a fluid pressure within said tank, respectively.

9. The in-water refueling system recited in claim 8, characterized in that said controller further comprises a variable frequency drive (VFD) operably coupled to said main pump for regulating said fluid pressure of said tank.

10. The in-water refueling system recited in claim 8, characterized in that said controller further comprises a flow meter in communication with said secondary submersible pump for regulating an electrolysis based on said temperature.

11. The in-water refueling system recited in claim 7, characterized in that said first gas is hydrogen.

12. The in-water refueling system recited in claim 7, characterized in that said second gas is oxygen.

13. The in-water refueling system recited in claim 7, further comprising a liquid storage bladder in fluid communication with an inlet of said main pump.

14. The in-water refueling system recited in claim 7, further comprising a motor operably coupled to said main pump.

15. An in-water refueling system for UUVs with fuel cell propulsion, comprising:
   a tank having a bottom opening, first and second top openings, and an interior space for storing a liquid;
   a rotary screw pump having an outlet that is sealably coupled to said bottom opening and in fluid communication with said interior space;
   a first open-bottom cylinder disposed within said tank and comprising:
      a first cylindrical body sealably coupled to said first top opening and having a first cylindrical space in fluid communication with said interior space; and
      a first float sensor adapted to raise and lower via buoyancy;
   a second open-bottom cylinder disposed within said tank and comprising:
      a second cylindrical body sealably coupled to said second top opening and having a second cylindrical space in fluid communication with said interior space; and
      a second float sensor adapted to raise and lower via buoyancy;
   wherein said first open-bottom cylinder is larger than said second open-bottom cylinder;
   first and second dispense lines disposed outside said tank and sealably coupled to said first and second top openings, respectively, such that said first and second dispense lines are in fluid communication with said first and second cylindrical spaces;
   a secondary submersible pump disposed within said tank for pumping said liquid; and
   an electrolysis stack assembly disposed within said tank and adapted to produce oxygen and hydrogen, said electrolysis stack assembly comprising:
      an electrolysis stack for converting said liquid into said oxygen and said hydrogen;
      an inlet in fluid communication with said secondary submersible pump for pumping said liquid into said electrolysis stack;
      a first outlet supply line traversing into said first cylindrical space for releasing said hydrogen into said first cylindrical space; and
      a second outlet supply line traversing into said second cylindrical space for releasing said oxygen into said second cylindrical space;
   wherein said first and second float sensors substantially encircle at least portions of said first and said second outlet supply lines, respectively, within said first and second cylindrical spaces, such that said first and second float sensors are adapted to raise and lower along said first and said second outlet supply lines.

16. The in-water refueling system recited in claim 15, further comprising a controller having a temperature sensor and a pressure sensor for determining a temperature and a fluid pressure within said tank, respectively.

17. The in-water refueling system recited in claim 16, characterized in that said controller further comprises a VFD operably coupled to said rotary screw pump for regulating said fluid pressure in said tank.

18. The in-water refueling system recited in claim 17, characterized in that said controller further comprises a flow meter in communication with said secondary submersible pump for regulating an electrolysis based on said temperature.

19. The in-water refueling system recited in claim 18, further comprising a liquid storage bladder in fluid communication with an inlet of said rotary screw pump.

20. The in-water refueling system recited in claim 19, further comprising a motor operably coupled to said rotary screw pump.

* * * * *